(No Model.)
E. F. LOUYS.
CULTIVATOR.
No. 552,714. Patented Jan. 7, 1896.
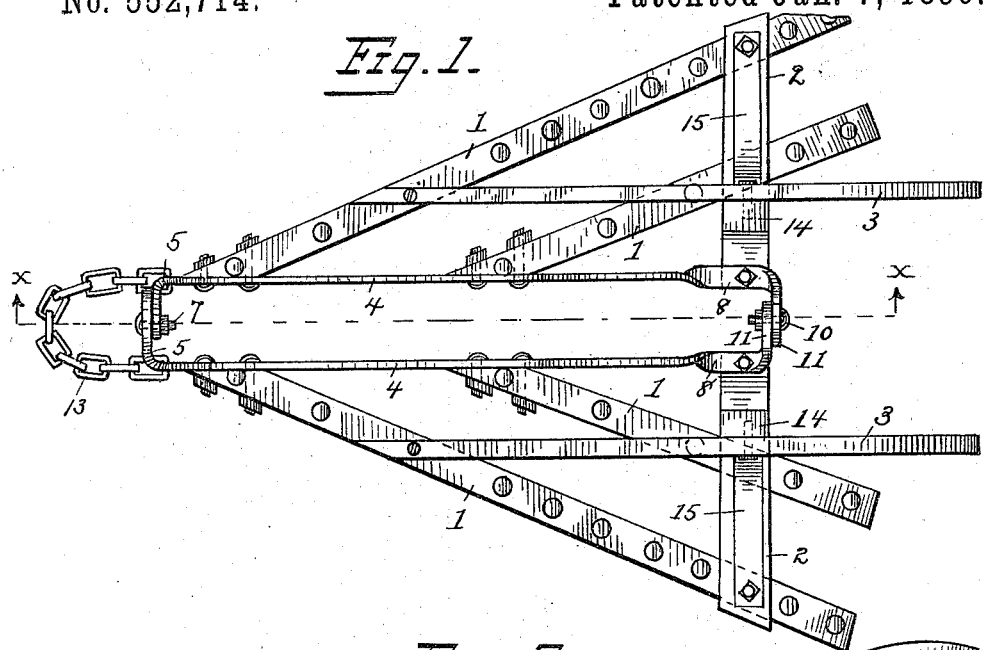
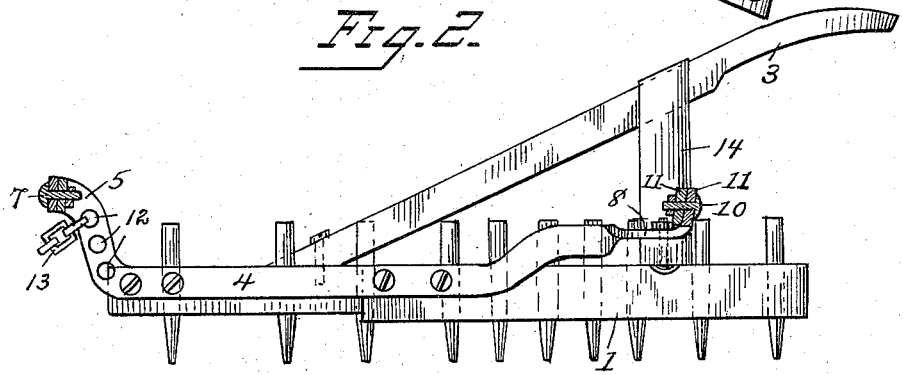
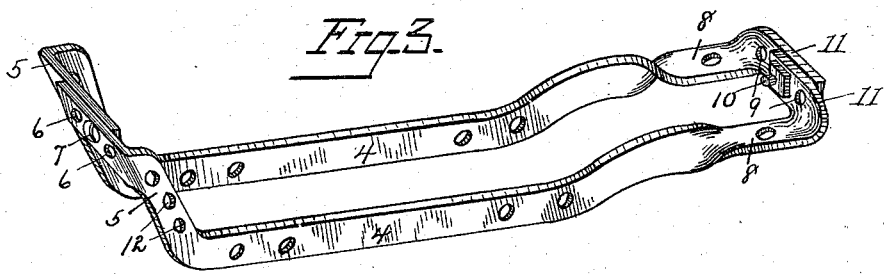
Witnesses
Albert Popkins
Claude Lunsford
Inventor
Even F. Louys
By Percy B. Hills
Attorney

UNITED STATES PATENT OFFICE.

EVEN F. LOUYS, OF STRYKER, OHIO.

CULTIVATOR.

SPECIFICATION forming part of Letters Patent No. 552,714, dated January 7, 1896.

Application filed July 8, 1895. Serial No. 555,321. (No model.)

*To all whom it may concern:*

Be it known that I, EVEN F. LOUYS, a citizen of the United States, residing at Stryker, in the county of Williams and State of Ohio, have invented certain new and useful Improvements in Cultivators, of which the following is a specification.

My invention relates to cultivators for corn and other growing crops planted in rows, and has for its object to provide a strong and simple arched connection between the two sides of the cultivator-frame whereby the latter may be brought close together or separated to a greater or less distance. This object I accomplish in the manner and by the means hereinafter described and claimed, reference being had to the accompanying drawings, in which—

Figure 1 is a top plan view of a cultivator embodying my improved construction. Fig. 2 is a central longitudinal section on the line *x x*, Fig. 1, looking in the direction of the arrows; and Fig. 3 is a detail perspective view of the longitudinal arched connecting-bars.

Similar figures of reference denote corresponding parts in the several views.

In the said drawings, the numeral 1 denotes the diagonal beams of a straddle-row cultivator provided with cultivator-teeth on their under sides, as shown. Cross-bars 2 connect these beams together near their rear ends, there being one cross-bar on each side of the cultivator. Suitable handles 3 bolted to the front beams and to vertical posts 14 rising from the cross-bars and projecting to the rear, as shown, are provided to serve as guides for the cultivator. Suitable braces 15 are also provided for said handles.

Running lengthwise of the cultivator from front to rear are the two longitudinal connecting brace-bars 4, one on each side of the cultivator, and to which are bolted or otherwise connected the beams 1 and the cross-bars 2, and which serve as supports for the adjacent ends of the same. Throughout the greater portion of their length these bars 4 are in a vertical plane and are bent upwardly and inwardly toward each other at their forward ends 5, and are each provided with a series of three or more holes 6 to receive the connecting-bolt 7 for fastening them together. At their rear ends the bars are bent first in a horizontal plane, as at 8, where the cross-bars 2 are bolted thereto, and then upwardly and inwardly toward each other at 11, and are also provided with a series of holes 9 to receive the connecting-bolt 10 in a manner similar to their connection at their forward ends. In the sides of their forward ends 5 the bars are also provided with aperture 12 to adjustably receive a trace-chain 13, as shown. It will thus be seen that the longitudinal bars bent into the shape described serve to provide a connecting-support for the inner ends of the beams and cross-bars of the cultivator, an adjustable arched connection for the two sections of the cultivator whereby the distance apart of these sections may be quickly and accurately adjusted to allow for the different widths of the rows of the corn or other crop to be cultivated, and as an adjustable means of connection for the trace-chain.

The longitudinal brace-bars are formed of any suitable material, preferably wrought-iron or steel.

Having thus described my invention, what I claim is—

1. In a cultivator, the combination with beams carrying cultivator teeth, and cross bars connecting the same, said beams and cross bars being formed in two independent sections, of two longitudinal brace bars connecting the adjacent ends of the beams and cross bars, and having their free ends at front and rear arched and adjustably connected together, substantially as described.

2. In a cultivator, the combination with beams carrying cultivator teeth, and cross bars connecting the same, said beams and cross bars being formed in two independent sections, of two longitudinal brace bars connecting the adjacent ends of the beams and cross bars, said brace bars lying in a vertical plane throughout the greater portion of their length, bent upwardly and inwardly at their forward ends and adjustably connected together, and bent first in a horizontal plane near their rear ends and then upwardly and inwardly and also adjustably connected together, substantially as described.

3. The combination with the two independent sets of diagonal teeth carrying beams 1, and the connecting cross bars 2 bolted thereto, of the two longitudinal brace bars 4 lying in a vertical plane throughout the greater portion of their length and having the inner ends of the beams 1 bolted thereto, then bent into a horizontal plane near their rear ends and having the cross bars 2 bolted thereto, and bent upwardly and inwardly at their front and rear ends and adjustably connected together, and a trace chain adjustably connected to their bent forward ends, substantially as described.

EVEN F. LOUYS.

Witnesses:
J. E. MEEK,
CHAS. MOUDY.